United States Patent

Sato et al.

[11] Patent Number: 5,434,675
[45] Date of Patent: Jul. 18, 1995

[54] STILL VIDEO DEVICE

[75] Inventors: Koichi Sato; Yasuhiro Yamamoto, both of Tokyo, Japan

[73] Assignee: Asahi Kogaku Kogyo Kabushiki Kaisha, Tokyo, Japan

[21] Appl. No.: 160,159

[22] Filed: Dec. 2, 1993

[30] Foreign Application Priority Data

Dec. 3, 1992 [JP] Japan .................................. 4-350910

[51] Int. Cl.⁶ .................................................. H04N 5/76
[52] U.S. Cl. ........................................ 358/335; 358/342
[58] Field of Search ................ 358/335, 342, 310, 339, 358/337, 906; 360/32, 36.2

[56] References Cited

U.S. PATENT DOCUMENTS

| | | | |
|---|---|---|---|
| 5,249,065 | 9/1993 | Juso et al. | 358/335 |
| 5,253,076 | 10/1993 | Adachi | 358/339 |
| 5,361,135 | 11/1994 | Yamamoto et al. | 358/335 |
| 5,363,264 | 11/1994 | Cavanaugh et al. | 360/11.1 |

FOREIGN PATENT DOCUMENTS 64-37193 2/1989 Japan.

*Primary Examiner*—Tommy P. Chin
*Assistant Examiner*—Robert Chevalier
*Attorney, Agent, or Firm*—Sandler, Greenblum & Bernstein

[57] ABSTRACT

In a still video device, a high definition image signal corresponding to one frame is passed through a low-pass filter with a cut-off frequency $f_{ch}$, divided into "m" of parts, and stored in a memory at a sampling frequency $f_{sh}$. The horizontal scanning frequency of the high definition image signal is $f_{hh}$, and the horizontal effective period ratio of the high definition image signal is $e_{hh}$. The image signal is read out from the memory at a sampling frequency $f_{sn}$ so that the image signal is time-expanded to be transformed to a normal image signal, which is passed through a low-pass filter with a cut-off frequency $f_{cn}$. The horizontal scanning frequency of the normal image signal is $f_{hn}$, and the horizontal effective period ratio of the normal image signal is $e_{hn}$. The parameters satisfy the following relationships, $$f_{ch} \cdot K \leq f_{ch} \cdot (f_{sn}/f_{sh}) \leq f_{cn} \leq f_{sn}/2, f_{cs} \geq f_{cn}$$

wherein $$K = (f_{hn}/f_{hh}) \cdot (e_{hh}/e_{hn}) \cdot (1/m).$$

11 Claims, 5 Drawing Sheets

STILL VIDEO DEVICE

BACKGROUND OF THE INVENTION

1. Field of the Invention

The present invention relates to a still video device by which an image signal is recorded on a recording medium, or the image signal is reproduced from the recording medium.

2. Description of the Related Art

In a usual still video device, an image signal inputted thereto is frequency-modulated and recorded on a magnetic disk, and the band of frequencies of the signal recorded in the magnetic disk is regulated (or made constant). Nevertheless, the band of frequencies of the signal is limited, due to the construction of the disk device, and thus cannot be freely expanded.

Accordingly, in a conventional still video device, when a high quality or wide bandwidth image signal is inputted to the still video device, a limit is imposed on the resolution of the image and thus the quality of the image is limited.

One of the present inventors has proposed, in U.S. patent application Ser. No. 07/913,191, a still video device in which an image signal corresponding to one frame is divided into a plurality of parts and stored in a memory, and the divided parts of the image signal are time-expanded and recorded on a plurality of tracks of a recording medium such as a magnetic disk, so that a high quality image can be obtained without changing the band of frequencies of the signal recorded on the recording medium.

In this still video device, however, if the image signal is not properly time-expanded when the image signal is recorded on the magnetic disk, or if the image signal is not properly time-compressed when the image signal is reproduced from the magnetic disk, a part of the image signal (for example, a pixel at the end of the frame) may be missing from the frame, or the resolution of the image may be reduced, and thus, a high quality image cannot be obtained.

SUMMARY OF THE INVENTION

Therefore, an object of the present invention is to provide a still video device, by which time-expansion or time-compression of an image signal is properly carried out, so that a part of the image signal is not missing from the frame, the resolution of the image is not lowered, and a high quality image can be obtained.

According to the present invention, there is provided a still video device for recording an image signal on a recording medium in which the upper limit of the band of frequencies of the image signal which can be recorded in the recording medium is $f_{cs}$, the device comprising a memory in which a high definition image signal corresponding to one frame can be stored, a storing mechanism, a dividing mechanism, a reading mechanism, and a recording mechanism.

The horizontal scanning frequency of the high definition image signal is $f_{hh}$. The horizontal effective period ratio of the high definition image signal is $e_{hh}$. The upper limit of the band of frequencies of the high definition image signal is $f_{ch}$. The storing mechanism stores the high definition image signal in the memory with a sampling frequency $f_{sh}$. The dividing mechanism divides the high definition image signal into "m" parts, "m" being a natural number. The reading mechanism reads the divided high definition image signal with a sampling frequency $f_{sn}$ to time-expand the divided high definition image signal, to set the upper limit of the band of frequencies of the time-expanded image signal to $f_{cn}$, and to obtain a normal image signal (an image signal which can be recorded on the recording medium). The recording mechanism records the normal image signal on the recording medium. The above parameters satisfy the following relationships:

$$f_{ch} \cdot K \leq f_{ch} \cdot (f_{sn}/f_{sh}) \leq f_{cn} \leq f_{sn}/2, \text{ and } f_{cs} \geq f_{cn},$$

wherein $$K = (f_{hn}/f_{hh}) \cdot (e_{hh}/e_{hn}) \cdot (1/m), f_{hn}$$

is the horizontal scanning frequency of the normal image signal, and $e_{hh}$ is the horizontal effective period ratio of the normal image signal.

Further, according to the present invention, there is provided a still video device for reproducing from a recording medium, the upper limit of the band of frequencies of the image signal which can be reproduced from the recording medium being $f'_{cs}$, a high definition image signal corresponding to one frame divided into "m" parts and time-expanded to a normal image signal which can be stored in the recording medium, the device comprising a storing mechanism, a reading mechanism, and a generating mechanism.

The storing mechanism stores the divided normal image signal recorded on the recording medium in a memory with a sampling frequency $f'_{sn}$. The upper limit of the band of frequencies of the divided normal image signal is $f'_{cn}$. The reading mechanism reads the divided normal image signal with a sampling frequency $f'_{sh}$ to time-compress the divided normal image signal. The reading mechanism combines the divided normal image signals to form one time-compressed image signal. The generating mechanism generates a high definition image signal from the time-compressed image signal. The generating mechanism sets the upper limit of the band of frequencies of the time-compressed image signal to $f'_{ch}$ to obtain the high definition image signal. The horizontal scanning frequency of the high definition image signal is $f'_{hh}$. The horizontal effective period ratio of the high definition image signal is $e'_{hh}$. The above parameters satisfy the following relationships:

$$f'_{cn}/K' \leq f'_{cn} \cdot (f'_{sh}/f'_{sn}) \leq f'_{ch} \leq f'_{sh}/2, \text{ and } f'_{cs} \geq f'_{cn},$$

wherein $$K' = (f'_{hn}/f'_{hh}) \cdot (e'_{hh}/e'_{hn}) \cdot (1/m), f'_{hn}$$

is the horizontal scanning frequency of the normal image signal, and $e'_{hn}$ is the horizontal effective period ratio of the normal image signal.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
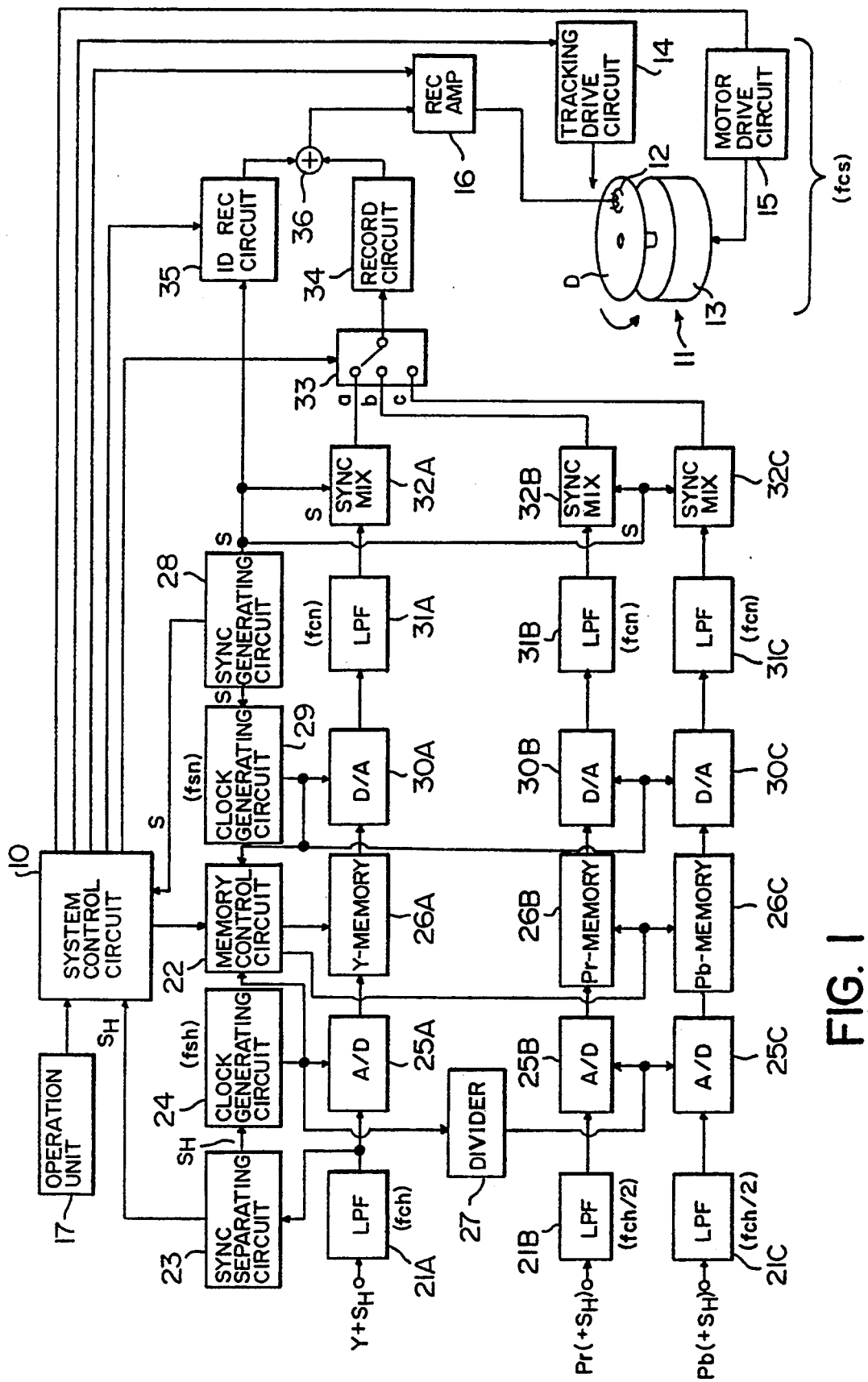
FIG. 1 is a block diagram showing a recording system for a still video device according to an embodiment of the present invention.

The present invention will now be described with reference to the embodiments shown in the drawings.

FIG. 1 is a block diagram showing a recording system for a still video device according to an embodiment of the present invention.

A system control circuit 10 comprise a microcomputer that controls the still video device as a whole. A disk device 11 has a magnetic head 12 and a spindle motor 13 for rotating a magnetic disk D. The magnetic head 12 is driven by a tracking drive circuit 14 controlled by the system control circuit 10 and is displaced along a radial direction of the magnetic disk D, and is thus positioned at a predetermined track on the magnetic disk D. The spindle motor 13 is driven by a motor drive circuit 15 which is controlled by the system control circuit 10 to rotate the magnetic disk D at a speed of 3,600 rpm, for example.

During the rotation of the magnetic disk D, the magnetic head 12 is positioned at a predetermined track on the magnetic disk D and records image signals and identification (ID) codes on this track. A recording amplifier 16 is controlled by the system control circuit 10 and outputs image signals, ID codes and other signals to the magnetic head 12. Note, the magnetic disk D has 52 tracks, and the image signals and the other signals are recorded on 50 tracks starting from the outermost track and continuing inward.

An operation unit 17 is connected to the system control circuit 10, to operate the still video device. The operation unit 17 includes a record mode selecting switch for selecting either a field record mode or a frame record mode, a head controlling switch for positioning the magnetic head 12 at a predetermined track of the magnetic disk D, a record switch for recording an image signal on the magnetic disk D, an erasing switch for erasing an image signal recorded on the magnetic disk D, and an image system selecting switch for selecting either a normal image system or a high definition image system. Further, the operation unit 17 has an operation mode selecting switch for designating whether the still video device is operated in a record mode or a reproduction mode. These switches are not shown in the drawing.

Further, a display unit, not shown, is connected to the system control circuit 10. Information such as the kind of record mode, whether the image system is a normal image system or a high definition image system, the track number, whether the track has been recorded or not, a recording date, whether a magnetic disk has been loaded or not, the kind of power source, and the present time, is indicated by a liquid crystal or a light emitting diode display unit. Further, whether the still video device is operating in the record mode or the reproduction mode is also indicated by the display unit.

High-quality image signals obtained through a still video camera (not shown) or an input terminal (not shown) are inputted to the still video device as a Y signal (a luminance signal) including a synchronizing signal $S_H$, a Pr signal (a differential color signal "R-Y") including a synchronizing signal $S_H$, and a Pb signal (a differential color signal "B-Y") including a synchronizing signal $S_H$. Note, in the drawing, the reference "H" added to the inputted signals indicate that the inputted image signals have been generated in accordance with the HDTV (High-Definition TV) mode. Further note, as is well known, that the Pr signal and the Pb signal have a wider band of frequencies than a conventional differential color signal, so that the color resolution of the image signal is improved.

The luminance signal $(Y+S_H)$ is passed through a low-pass filter 21A with a cut-off frequency $f_{ch}$, so that high frequency components, which are included in the luminance signal and can be noise (aliasing noise generated by a sampling), are removed. Horizontal and vertical synchronizing signals $(S_H)$ included in the luminance signal $(Y+S_H)$ are separated from the luminance signal $(Y+S_H)$ by a synchronizing-signal-separating circuit 23, and transmitted to a clock generating circuit 24 and the system control circuit 10. The clock generating circuit 24 generates a memory writing clock signal (frequency $f_{sh}$), based on which a writing operation is carried out to a Y-memory 26A, and which is inputted to a memory control circuit 22 and an A/D converter 25A.

The luminance signal (Y) from which the horizontal and vertical synchronizing signals $(S_H)$ have been separated is converted to a digital signal by the A/D converter 25A, and stored in a Y-memory 26A.

The differential color signal Pr is passed through a low-pass filter 21B with a cut-off frequency $f_{ch}/2$, A/D converted to a digital signal by an A/D converter 25B, and stored in a Pr-memory 26B. Similarly, the differential color signal Pb is passed through a low-pass filter 21C with a cut-off frequency $f_{ch}/2$, A/D converted to a digital signal by an A/D converter 25C, and stored in a Pb-memory 26C.

As described below, based on a memory writing clock signal outputted from the clock generating circuit 24, the following control is carried out by the memory control circuit 22 while the timing of data writing to the memories 26A, 26B and 26C is controlled by the memory control circuit 22.

Namely, based on the memory writing clock signal outputted from the clock generating circuit 24, the A/D converter 25A is operated at a frequency $f_{sh}$, and the memory control circuit 22 controls a writing address counter included therein, and thus, the digital luminance signal (Y) is written in a predetermined address of the Y-memory 26A at a frequency $f_{sh}$.

The memory writing clock signal outputted from the clock generating circuit 24 is halved (to $f_{sh}/2$) by a divider 27, so that the A/D converters 25B and 25C are operated at the frequency $f_{sh}/2$, and the memory control circuit 22 controls the writing address counter included therein, and thus, the digital differential color signals (Pr) and (Pb) are written in predetermined addresses of the Pr-memory 26B and the Pr-memory 26C at a frequency $f_{sh}/2$.

Note, the synchronizing signal $(S_H)$ included in the signal inputted to the still video device is not sampled, and therefore, is not written into the memories 26A, 26B and 26C.

Horizontal and vertical synchronizing signals (S) according to the NTSC system, for example, are outputted from a synchronizing signal generating circuit 28, and are inputted into a clock generating circuit 29. In the clock generating circuit 29, a memory reading clock signal (frequency $f_{sn}$), based on which data is read out from each of the memories 26A, 26B and 26C, is generated. The memory reading clock signal is inputted to the memory control circuit 22, and D/A converters 30A, 30B and 30C.

As described below, based on the memory reading clock signal outputted from the clock generating circuit 29, the following control is carried out by the memory control circuit 22 while the timing of reading data from the memories 26A, 26B and 26C is controlled by the memory control circuit 22.

Namely, based on the memory reading clock signal outputted from the clock generating circuit 29, the memory control circuit 22 controls a reading address counter included therein, and thus, the digital luminance signal (Y) is read out from a predetermined address of the Y-memory 26A at the frequency $f_{sn}$, and D/A converter 30A is operated so that the luminance signal (Y) is converted to an analogue signal at the frequency $f_{sn}$.

Based on the memory reading clock signal outputted from the clock generating circuit 29, the memory control circuit 22 controls a reading address counter included therein, and thus, the digital differential color signals (Pr) and (Pb) are read out from predetermined addresses of the Pr-memory 26B and the Pb-memory 26C at the frequency $f_{sn}$, and the D/A converter 30B and 30C are operated so that the differential color signals (Pr) and (Pb) are converted to analogue signals at the frequency $f_{sn}$.

Note, in the memory control circuit 22, switching between writing to the memories and reading from the memories is controlled in accordance with a mode switching command signal outputted from the system control circuit 10.

Further note, the horizontal and vertical synchronizing signals ($S_H$) outputted from the synchronizing signal separating circuit 23 and the horizontal and vertical synchronizing signals (S) outputted from the synchronizing signal generating circuit 28 are inputted to the system control circuit 10, so that the signals are used for a rotational phase control of the spindle motor 13 and other operations.

When a high quality image is recorded on the magnetic disk D in this embodiment, the memory reading clock signal outputted from the clock generating circuit 29 has a lower frequency, a quarter for example, than the memory writing clock signal outputted from the clock generating circuit 24. Therefore, in the example, the frequency of the reading clock signal for the luminance signal is ¼ of the frequency of the writing clock signal, and the frequencies of the reading clock signals for the differential color signals are ½ the frequencies of the writing clock signals. Accordingly, the signals read out from the memories 26A, 26B and 26C are time-expanded in comparison with the signals inputted to the still video device. Due to this time-expansion, the high quality image signal is converted to a normal (lower frequency) image signal, and recorded on the magnetic disk D.

The analogue luminance signal (Y), differential color signals (Pr) and (Pb) are passed through low-pass filters 31A, 31B, and 31C with cut-off frequencies $f_{cn}$, respectively, so that high frequency components of the signals are removed, and the signals are then added to the vertical and horizontal synchronizing signals (S) outputted from the synchronizing signal generating circuit 28 by the synchronizing signal mixing circuits 32A, 32B and 32C.

The synchronizing signal mixing circuits 32A, 32B and 32C are connected to terminals a, b and c of switch 33. Operation of the switch 33 is controlled by the system control circuit 10, so that the luminance signal (Y+S), the differential color signal (Pr+S), and the differential color signal (Pb+S) are sequentially inputted into a recording process circuit 34 in which the inputted signals are frequency-modulated.

An ID code, indicating whether the image has been recorded in the field record mode or the frame record mode, the field number when the frame record mode has been employed, whether the image has been recorded in the normal image system or the high definition image system, the kind of image signals (the luminance signal (Y+S), the differential color signal (Pr+S), or the differential color signal (Pb+S)), the track number, and the recording date, are outputted from the system control circuit 10. An ID recording process circuit 35 DPSK-modulates (differential-phase-shift-keying-modulates) a carrier, which is generated based on the horizontal synchronizing signal (S) outputted from the synchronizing signal generating circuit 28, in accordance with the ID code, to obtain a DPSK signal.

The DPSK signal is superimposed on the image signal from the recording process circuit 34, by an adder 36.

The image signal and the superimposed ID signal are amplified by the recording amplifier 16, and recorded on a predetermined track of the magnetic disk D, through the magnetic head 12.

The high definition image signal corresponding to one frame is divided into a plurality of parts, and time-expanded to be recorded on a plurality of tracks of the magnetic disk D. For the time-expansion recording of the image signals in the magnetic disk D, the inputted image signals are divided into a plurality of parts, and stored in the memories 26A, 26B and 26C.

Figure 2:
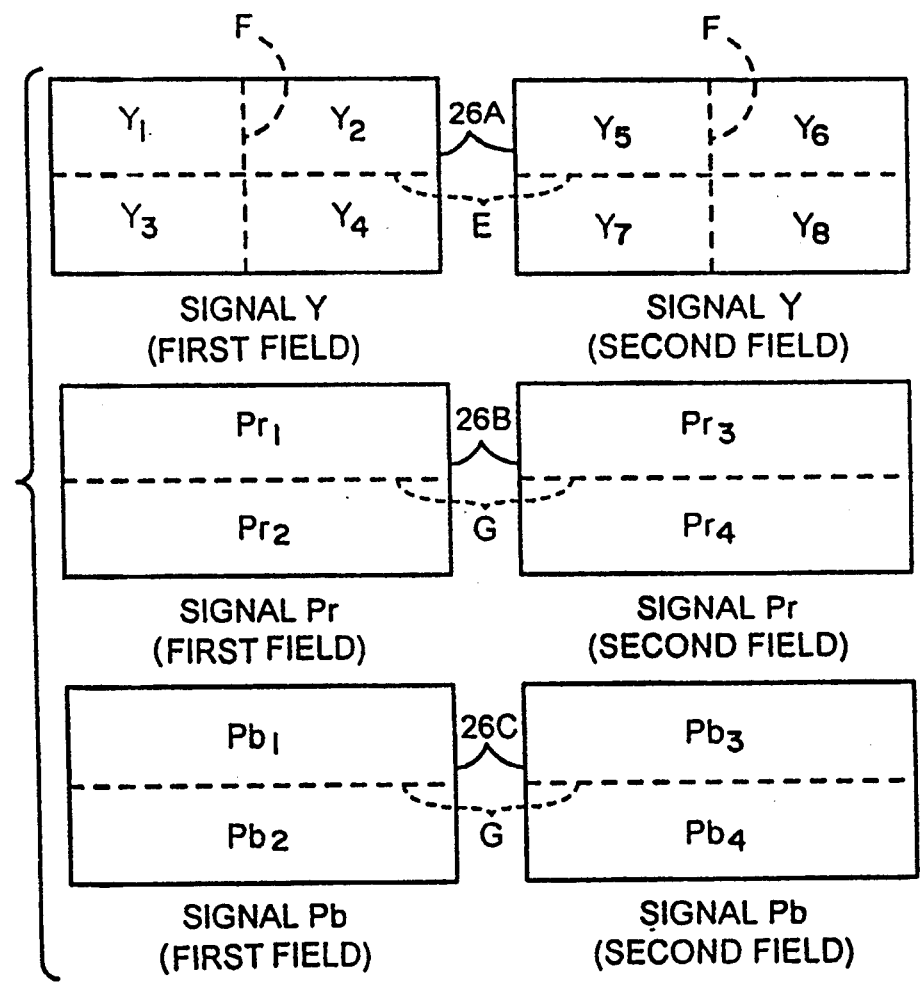
FIG. 2 is a diagram schematically showing an example of image signals in memories in the embodiment.

FIG. 2 schematically shows an example of image signals in the memories 26A, 26B and 26C. This example shows a high definition image recording mode in which an image signal is recorded in the frame record mode, and the luminance signal (Y), the differential color signal (Pr) and the differential color signal (Pb) are recorded on a plurality of tracks of the magnetic disk D. Namely, one frame is composed of a first field and a second field, and the luminance signal (Y) of one frame is divided into four parts, and the differential color signal (Pr) and the differential color signal (Pb) of one frame are divided into two parts. These divided parts are stored in the corresponding memories 26A, 26B and 26C, respectively. Note, in FIG. 3, a disposition of recording areas in the memories 26A, 26B and 27C correspond to an arrangement of images indicated on a display device.

Regarding the luminance signal (Y), the frame is divided into four parts by a center line E extending in a horizontal direction and passing through the center of the frame, and a center line F extending in a vertical direction and passing through the center of the frame. The luminance signal ($Y_1$) corresponding to the left upper quarter of the first field is stored in a first area of the memory 26A; the luminance signal ($Y_2$) corresponding to the right upper quarter of the first field is stored in a second area of the memory 26A; the luminance signal ($Y_3$) corresponding to the left lower quarter of the first field is stored in a third area of the memory 26A; and the luminance signal ($Y_4$) corresponding to the right lower quarter of the first field is stored in a fourth area of the memory 26A.

Regarding the differential color signal (Pr), the frame is divided into two parts by a center line G extending in a horizontal direction and passing through the center of the frame. The differential color signal ($Pr_1$) corresponding to the upper half of the first field is stored in a fifth area of the memory 26B; and the differential color signal ($Pr_2$) corresponding to the lower half of the first field is stored in a sixth area of the memory 26B.

Regarding the differential color signal (Pb), the frame is divided into two parts by a center line G extending in a horizontal direction and passing through the center of the frame. The differential color signal ($Pb_1$) corresponding to the upper half of the first field is stored in a seventh area of the memory 26C; and the differential color signal ($Pb_2$) corresponding to the lower half of the first field is stored in an eighth area of the memory 26C.

Similarly, regarding a second field, the luminance signals ($Y_5$, $Y_6$, $Y_7$, $Y_8$) corresponding to the left upper quarter, the right upper quarter, the left lower quarter and the right lower quarter are stored in a ninth area, a tenth area, an eleventh area and a twelfth area of the memory 26A, respectively. The differential color signals ($Pr_3$, $Pr_4$) corresponding to the upper and lower halves are stored in a thirteenth area and a fourteenth area of the memory 26B, respectively. The differential color signals ($Pb_3$, $Pb_4$) corresponding to the upper and lower halves are stored in a fifteenth area and a sixteenth area of the memory 26C, respectively.

Figure 3:
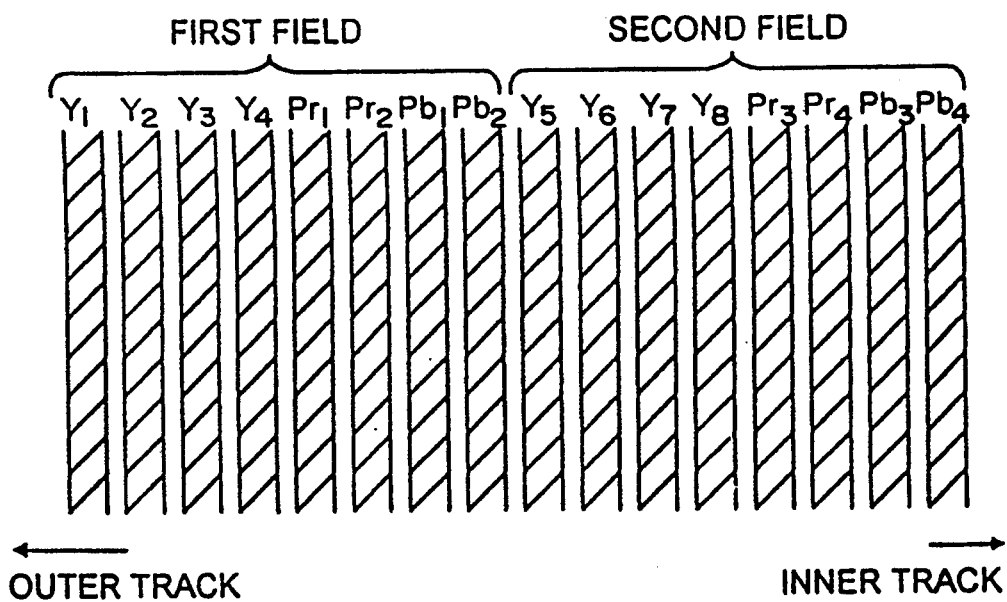
FIG. 3 is a diagram showing a track pattern formed on a magnetic disk.
Figure 4:
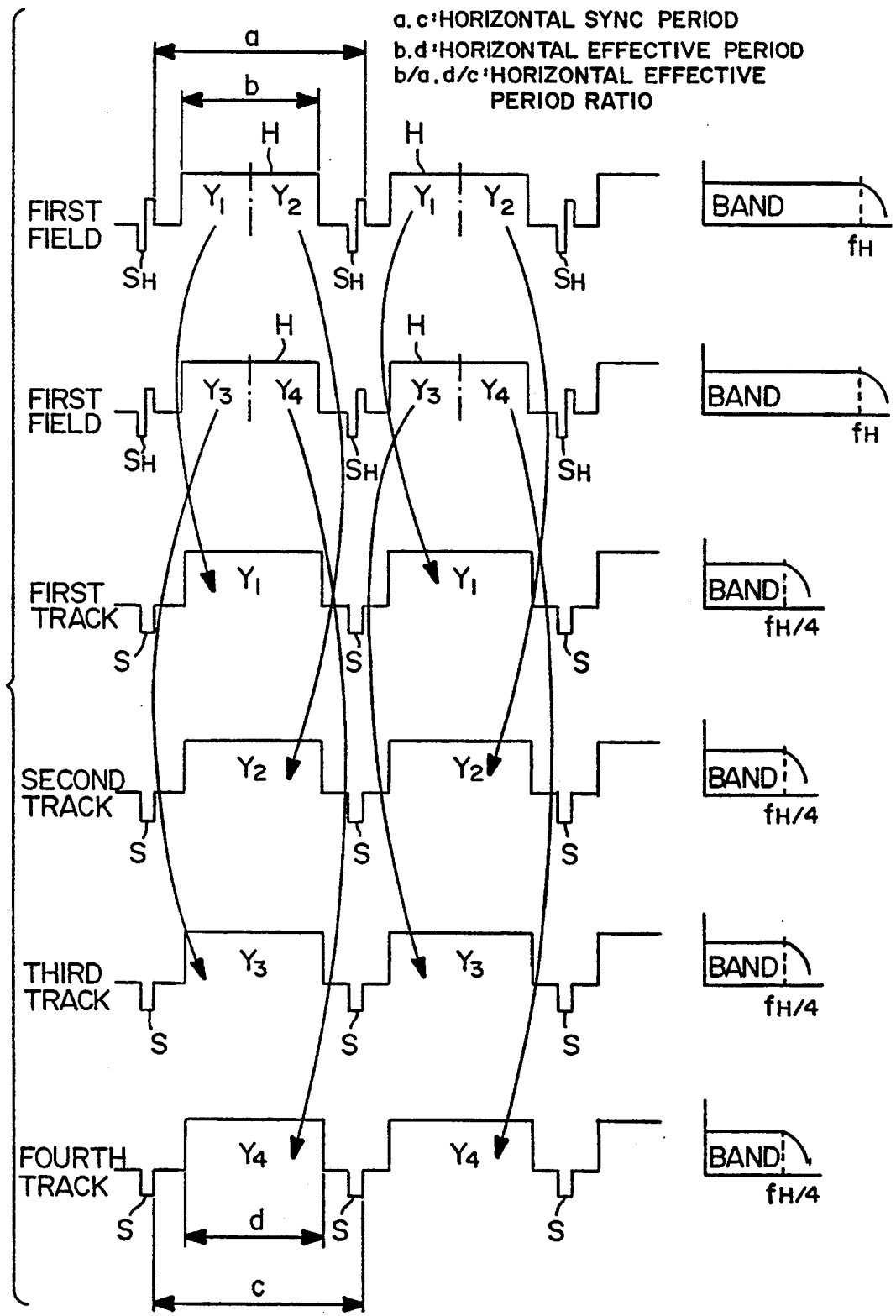
FIG. 4 is a diagram showing a relationship between a luminance signal inputted to the still video device and a luminance signal recorded on the magnetic disk.

FIG. 3 shows a track pattern formed on the magnetic disk D. As can be seen from the drawing, the image signals are recorded on sixteen tracks which are consecutively arranged on the magnetic disk D. The image signals corresponding to the first field are recorded on eight consecutively arranged tracks, and the image signals corresponding to the second field are recorded on the other eight consecutively arranged tracks. In the drawing, these signals are recorded consecutively on each track from an outer track to an inner track, in order of the luminance signals ($Y_1$, $Y_2$, $Y_3$, $Y_4$) of a first field, the differential color signals ($Pr_1$, $Pr_2$) of the first field, the differential color signals $Pb_1$, $Pr_2$) of the first field, the luminance signals ($Y_5$, $Y_6$, $Y_7$, $Y_8$) of a second field, the differential color signals ($Pr_3$, $Pr_4$) of the second field, and the differential color signals ($Pb_3$, $Pb_4$) of the second field FIG. 4 shows the relationship between a luminance signal (Y) inputted to the still video device and a luminance signal (Y) recorded on the magnetic disk D, when the luminance signal (Y) is recorded on the magnetic disk D in the high definition signal record mode. One frame is composed of a first field and a second field, and the luminance signal (Y) of the first field is shown in FIG. 4. The luminance signal (Y) of the first field has a plurality of horizontal scanning lines H, and the luminance signal corresponding to one horizontal scanning line H exists between two adjacent horizontal synchronizing signals $S_H$ (referred to as a horizontal synchronizing period, hereinafter).

When the luminance signal is recorded, switch 33 is closed at terminal a, and the magnetic head 12 is sequentially moved from the first track (an outer track) to the fourth track (an inner track) on the magnetic disk D. Namely, the magnetic head 12 is positioned at the first track when recording the luminance signal ($Y_1$); the magnetic head 12 is positioned at the second track when recording the luminance signal ($Y_2$); the magnetic head 12 is positioned at the third track when recording the luminance signal ($Y_3$); and the magnetic head 12 is positioned at the fourth track when recording the luminance signal ($Y_4$) (see FIG. 3). Note, in the description of the embodiment, the Nth track does not mean the Nth track counted from the outermost track on the magnetic disk, but is a relative track number counted from a predetermined track.

As shown in FIG. 4, the band of frequencies of the luminance signals ($Y_1$, $Y_2$, $Y_3$, $Y_4$) stored in the memory 26A is $f_H$. When read out from memory 26A, the luminance signals ($Y_1$, $Y_2$, $Y_3$, $Y_4$) are time-expanded four times. Namely, the band of frequencies of the luminance signals ($Y_1$, $Y_2$, $Y_3$, $Y_4$) recorded on the first through fourth tracks of the magnetic disk D is $f_H/4$.

The maximum band of frequencies of the luminance signals ($Y_1$, $Y_2$, $Y_3$, $Y_4$) recorded on the magnetic disk D is limited by the structure of the disk device, and therefore, a luminance signal having a wider band of frequencies cannot be recorded on the disk D. In this embodiment, however, for one frame, the luminance signal (Y) is divided into a plurality of parts to be stored in the memory 26A, and then, the divided luminance signals are read out from the memory 26A while subjected to time-expansion, and are recorded on the magnetic disk D with a predetermined band of frequencies. Accordingly, even when the band of frequencies of the inputted luminance signal (Y) is wider than that of the widest luminance signal that can be recorded on the magnetic disk D, the content of the inputted luminance signal can be recorded on the magnetic disk D. Namely, even when the luminance signal of a high quality or high definition image is inputted to the still video device, the luminance signal can be recorded on the magnetic disk D while maintaining the high quality thereof.

Figure 5:
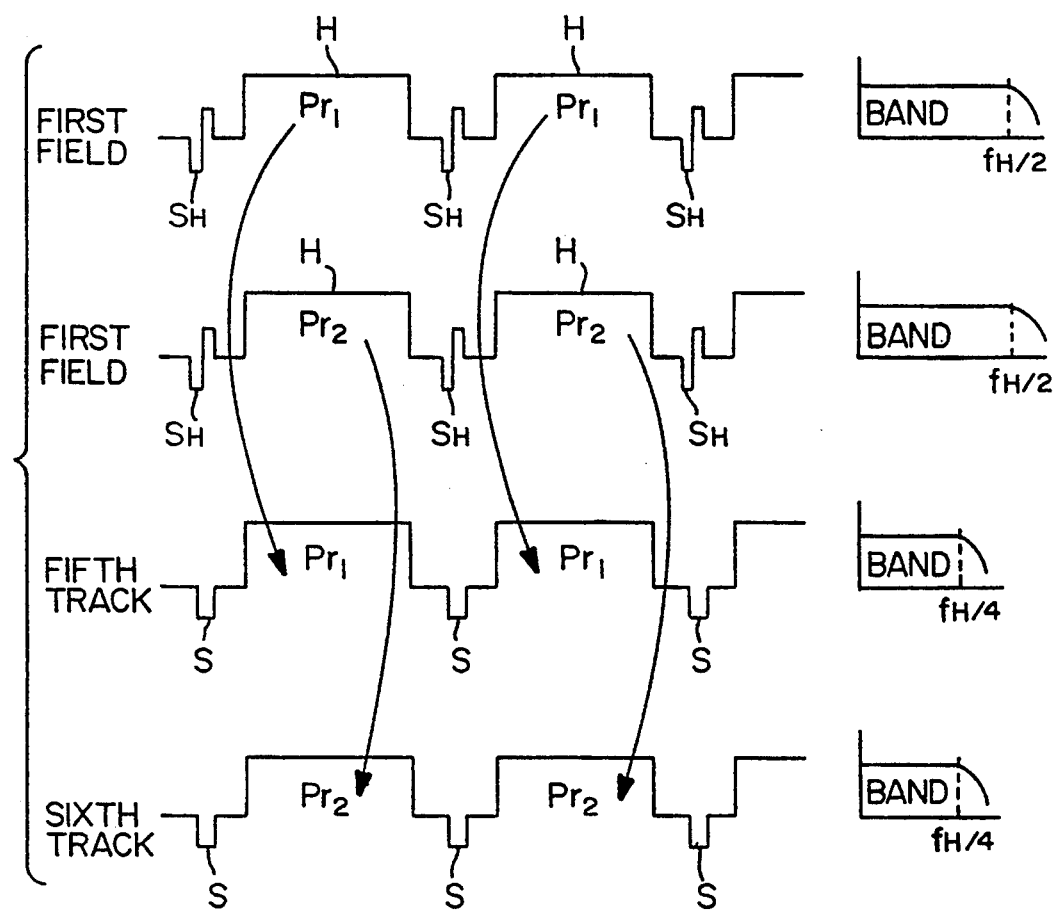
FIG. 5 is a diagram showing a relationship between a differential color signal inputted to the still video device and a differential color signal recorded on the magnetic disk.

FIG. 5 shows the relationship between a differential color signal (Pr) inputted to the still video device and a differential color signal (Pr) recorded on the magnetic disk D, when the differential color signal (Pr) is recorded in the magnetic disk D in the high definition signal record mode. One frame is composed of a first field and a second field, and the differential color signal (Pr) of the first field is shown in FIG. 5. The differential color signal (Pr) of the first field has a plurality of horizontal scanning lines H, and the differential color signal corresponding to one horizontal scanning line H exists in the horizontal synchronizing period.

When the differential color signal (Pr) is recorded, switch 33 is closed at terminal b, and the magnetic head 12 is sequentially moved from the fifth track to the sixth track. Therefore, the differential color signal ($Pr_1$) is recorded on the fifth track, and the differential color signal ($Pr_2$) is recorded on the sixth track (see FIG. 3).

As shown in FIG. 5, the band of frequencies of the differential color signals ($Pr_1$, $Pr_2$) stored in the memory 26B is $f_H/2$. When read out from the memory 26B, the differential color signals ($Pr_1$, $Pr_2$) are time-expanded two times. Namely, the band of frequencies of the differential color signals (Pr$_1$, Pr$_2$) recorded on the fifth and sixth tracks of the magnetic disk D is $f_H/4$.

Accordingly, even when the band of frequencies of inputted differential color signal is wider than that of the widest differential color signal that can be recorded on the magnetic disk D, the content of the inputted differential color signal can be recorded on the magnetic disk D. Namely, even when the inputted differential color signal of a high quality or high definition image is inputted to the still video device, the differential color signal can be recorded on the magnetic disk D while maintaining the high quality thereof.

When the differential color signal (Pb) is recorded, switch 33 is closed at terminal c, and the magnetic head 12 is sequentially moved from the seventh track to the eighth track. Therefore, similarly to the differential color signal (Pr), the differential color signal (Pb$_1$) is recorded on the seventh track with a band of frequencies $f_H/4$, and the differential color signal (Pb$_2$) is recorded on the eighth track with a band of frequencies $f_H/4$.

Regarding recording of the luminance signals (Y$_5$, Y$_6$, Y$_7$, Y$_8$), the differential color signal (Pb$_3$, Pb$_4$, Pr$_3$, Pr$_4$) of the second field, it is the same as the first field, and the signals are recorded in the (N=8)th tracks (N=1 through 8) (see FIG. 3).

Note, the synchronizing signal recorded on the magnetic disk D is not the synchronizing signal (S$_H$) for the high definition image, but is replaced by a synchronizing signal (S) according to the NTSC system, for example.

A proper condition in which the high definition image signal is time-expanded and recorded on the magnetic disk D is described below, with reference to the luminance signal (Y) as an example.

Suppose that the high definition image of one frame is divided into "m" parts by lines extending in vertical directions. Namely, the high definition image of one frame is divided into "m" parts in every horizontal scanning line direction (i.e., every main scanning line direction). Note, the number of pixels in one horizontal scanning line of the high definition image signal is equal to "m" multiplied by the number of pixels in one horizontal scanning line of the normal image signal.

In this case, the sampling frequencies, with which all the data included in "1/m" times a horizontal effective period of the high definition image signal is recorded in the horizontal effective period of the normal image signal, should satisfy the following relationship (1):

$$(f_{sh}/f_{hh}) \cdot e_{hh} \cdot (1/m) \leq (f_{sn}/f_{hn}) \cdot e_{hn} \qquad (1)$$

Note, the horizontal effective period represents a period in which an image signal is allocated in a horizontal scanning period, as shown by the references b and d in FIG. 4. Namely, the reference b indicates the horizontal effective period of the high definition image signal, and the reference d indicates the horizontal effective period of the normal image signal.

Further, in the relationship (1), the number "m" is a natural number, $f_{sh}$ is the sampling frequency of the high definition image signal (the frequency of the memory writing clock signal), $f_{hh}$ is the horizontal scanning frequency of the high definition image signal, $e_{hh}$ is the horizontal effective period ratio of the high definition image signal, $f_{sn}$ is the sampling frequency of the normal image signal (the frequency of the memory reading clock signal), $f_{hn}$ is the horizontal scanning frequency of the normal image signal, and $e_{hn}$ is the horizontal effective period ratio of the normal image signal.

Note, the horizontal scanning frequency means the frequency of scanning in a horizontal direction of the frame, and the horizontal effective period ratio represents a ratio of the horizontal effective period to the horizontal synchronizing period. Namely, when the horizontal synchronizing periods are represented by the references a and c, in the high definition image signal and the normal image signal, respectively, the horizontal effective period ratio of the high definition image signal is b/a, and the horizontal effective period ratio of the normal image signal is d/c, respectively.

By transforming the relationship (1), relationship (2) is obtained, wherein K is defined by equation (3):

$$f_{sn} \geq f_{sh} \cdot (f_{hn}/f_{hh}) \cdot (e_{hh}/e_{hn}) \cdot (1/m) = f_{sh} \cdot K \qquad (2)$$

$$K = (f_{hn}/f_{hh}) \cdot (e_{hh}/e_{hn}) \cdot (1/m) \qquad (3)$$

The band of the frequencies of the high definition image signal is reduced by a factor of $(f_{sn}/f_{sh})$ due to the time-expansion. Therefore, the high definition image signal, in which the upper limit of the band of frequencies is limited by the low-pass filter 21A with a cut-off frequency $f_{ch}$, is transformed to an image signal with a band of frequencies $f_{ch} \cdot (f_{sn}/f_{sh})$ due to the time-expansion. Accordingly, the cut-off frequency $f_{cn}$ of the low-pass filter 31A connected to the D/A converter 30A is set to a value defined by the following relationship (4), taking account of the sampling theorem:

$$f_{ch} \cdot (f_{sn}/f_{sh}) \leq f_{cn} \leq f_{sn}/2 \qquad (4)$$

On the other hand, both of the members of the relationship (2) are multiplied by $(f_{ch}/f_{sh})$, so that the following relationship (5) is obtained:

$$f_{sn} \cdot (f_{ch}/f_{sh}) \geq f_{ch} \cdot K \qquad (5)$$

Accordingly, from the relationships (4) and (5), the following relationship (6) is obtained:

$$f_{ch} \cdot K \leq f_{ch} \cdot (f_{sn}/f_{sh}) \leq f_{cn} \leq f_{sn}/2 \qquad (6)$$

If the cut-off frequency $f_{cn}$ is smaller than $f_{ch} \cdot (f_{sn}/f_{sh})$, a high frequency component of the image signal is cut or removed, and therefore, the resolution of the image is lowered. On the other hand, if the cut-off frequency $f_{cn}$ is larger than $f_{sn}/2$, aliasing noise due to sampling can be present in the image signal.

If the relationship (6) is multiplied by $(f_{sh}/f_{ch})$, the following relationship (7) is obtained:

$$f_{sh} \cdot K \leq f_{sn} \leq f_{cn} \cdot (f_{sh}/f_{ch}) \leq (f_{sh}/f_{ch}) \cdot f_{sn}/2 \qquad (7)$$

If the sampling frequency $f_{sn}$ is smaller than $f_{sh} \cdot K$, some pixels are not recorded on the magnetic disk D.

Note, the upper limit frequency $f_{cs}$ of the band of frequencies of the image signal which can be recorded on the magnetic disk D satisfies the following relationship (8):

$$f_{cn} \leq f_{cs} \qquad (8)$$

If the upper limit frequency $f_{cs}$ is smaller than $f_{cn}$, that part of the band of frequencies of the image signal which is higher than $f_{cs}$ cannot be recorded on the magnetic disk D, and thus the resolution of the image is lowered.

Note, regarding the differential color signals (Pr) and (Pb), the cut-off frequency of each of the low-pass filters 21B and 21C is $f_{ch}/2$, the sampling frequency of each of the A/D converters 25B and 25C is $f_{sh}/2$, and the number of divisions by a vertical line is $m/2$ (wherein $m \neq 1$). Therefore, the proper condition is the same as the above relationships (6) and (8).

As described above, in the embodiment, when the high definition image signal is time-expanded and recorded on the magnetic disk D, the above conditions are selected.

Namely, in the recording system of the still video device, each of the low-pass filters 31A, 31B and 31C is constructed in such a manner that the cut-off frequency $f_{cn}$ satisfies the relationship (6), the recording mechanism is constructed in such a manner that the upper limit frequency $f_{cs}$ of the band of frequencies of the image signal which can be recorded on the magnetic disk D satisfies the relationship (8), and the clock generating circuit 29 is constructed in such a manner that a clock signal, which causes the sampling frequency $f_{sn}$ of each of the D/A converters 30A, 30B and 30C to satisfy the relationship (6), is generated.

Therefore, since the time-expansion is properly carried out when the image signal is recorded on the magnetic disk D, the still video device does not have a drawback in which, for example, a part of the image (a pixel located at an end portion of the frame, for example) is lost and the resolution of the image is lowered, and thus an excellent high definition image can be obtained.

As described below, a proper condition is obtained in an example, in which, regarding the luminance signal, one frame of a high definition image is divided into two parts ($m=2$) by a line extending in a vertical direction, and regarding the differential color signal, one frame of a high definition image is not divided ($m=1$) by a vertical line:

Namely, when $f_{cs}=8.5$ MHz, and regarding the luminance signal (Y), $f_{sh}=74.25$ MHz, $f_{hh}=33.75$ kHz, $e_{hh}=0.87$, $f_{ch}=30$ MHz, $f_{hn}=15.7$ kHz, and $e_{hh}=0.85$, by substituting these values and $m=2$ for the relationships (6) and (8), the following relationships (9) and (10) are obtained:

$$7.14 \text{ MHz} \leq 0.404 \cdot f_{sn} \leq f_{cn} \leq f_{sn}/2 \tag{9}$$

$$f_{cn} \leq 8.5 \text{ MHz} \tag{10}$$

The following relationship (11) is obtained from the above relationship (9):

$$f_{sn} \geq 17.7 \text{ MHz} \tag{11}$$

Supposing $f_{sn}=18$ MHz, the following relationship (12) is obtained from the above relationships (9) and (10):

$$7.27 \text{ MHz} \leq f_{cn} \leq 9 \text{ MHz} \tag{12}$$

The following relationship (13) is obtained from the above relationships (10) and (12):

$$7.27 \text{ MHz} \leq f_{cn} \leq 8.5 \text{ MHz} \tag{13}$$

Note, regarding the differential color signals (Pr) and (Pb), since $f_{ch}=15$ MHz, $m=1$, and the other conditions are the same as those of the luminance signal, the relationship (13) is obtained in the same manner as the luminance signal.

As described above, in the recording system having a recording mechanism by which an image signal having a band of frequencies of 8.5 MHz can be recorded, when the sampling frequency $f_{sn}$ of the D/A converter is set to 18 MHz, a loss of a part of the image or a reduction of the resolution of the image do not occur if the cut-off frequency $f_{cn}$ of the low-pass filter connected to the D/A converter is set to between 7.27 MHz and 8.5 MHz.

Figure 6:
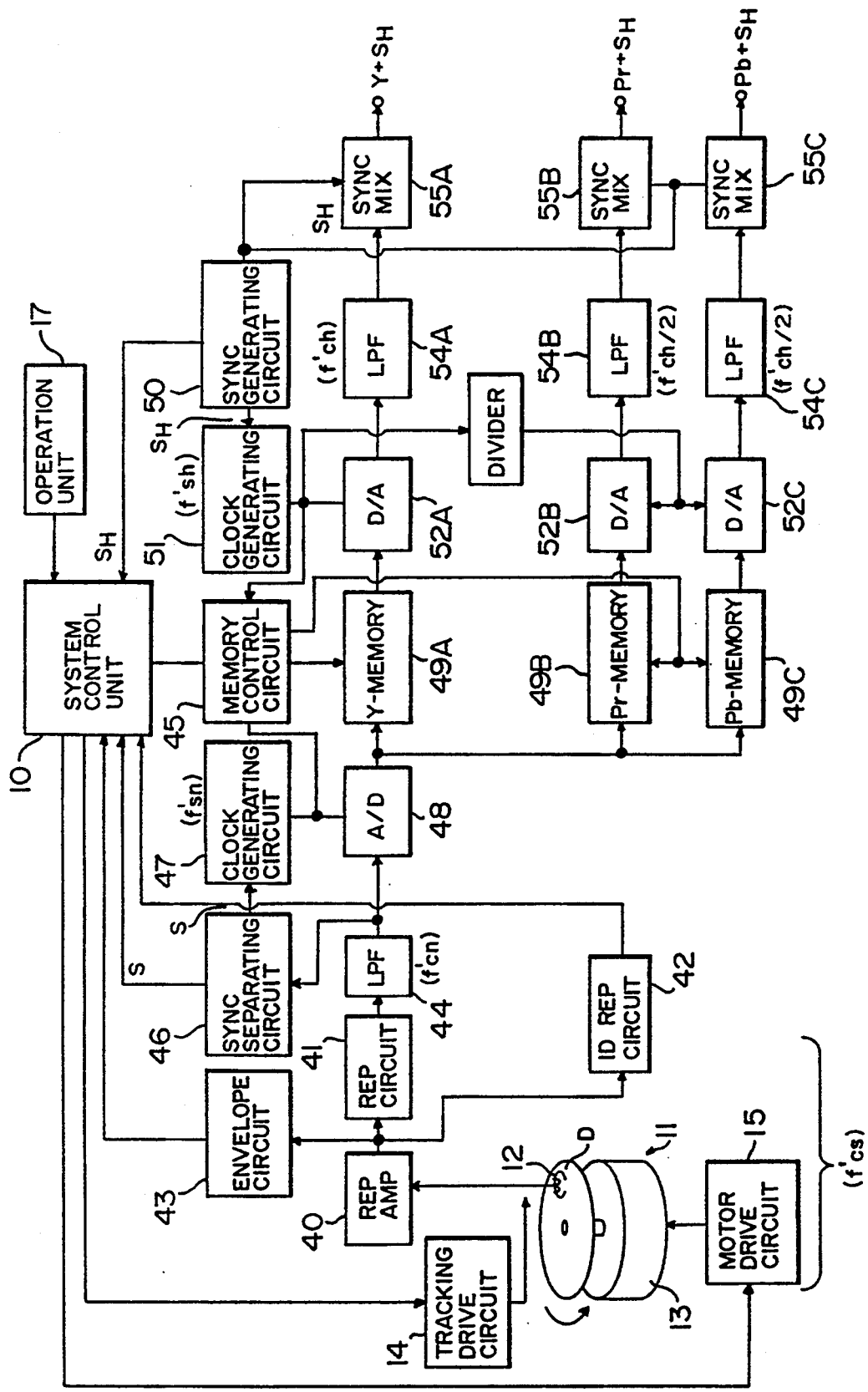
FIG. 6 is a block diagram showing a reproducing system for the still video device according to an embodiment of the present invention.

FIG. 6 is a block diagram showing a reproducing system of the still video device.

The system control circuit 10, the operation unit, the display unit not shown, and the disk device 11 which comprises the magnetic head 12, the spindle motor 13, the tracking drive circuit 14, the motor drive circuit 15 are also included in the recording system shown in FIG. 1; i.e., are provided for both the recording system and the reproducing system.

The magnetic head 11 is moved through predetermined tracks (16 tracks in FIG. 3) of the magnetic disk D, in a predetermined order, on which image signals corresponding to one still image are recorded, so that a DPSK signal and an image signal recorded on the track are reproduced.

In the case of image signals which are recorded on 16 tracks and which correspond to one still image, first, the luminance signals ($Y_1$, $Y_2$, $Y_3$, $Y_4$) recorded on outer tracks of the magnetic disk D are read therefrom and stored in a Y-memory 49A. Then, the differential color signals ($Pr_1$, $Pr_2$) recorded on tracks adjacent to and inside the tracks of the luminance signals are read therefrom and stored in a Pr-memory 49B, and the differential color signals ($Pb_1$, $Pb_2$) recorded on tracks adjacent to and inside the tracks of the differential color signals ($Pr_1$, $Pr_2$) are read therefrom and stored in a Pb-memory 49C. Thus, the image signals of the first field are reproduced. After that, similarly, the luminance signals ($Y_5$, $Y_6$, $Y_7$, $Y_8$), the differential color signals ($Pr_3$, $Pr_4$) and the differential color signals ($Pb_3$, $Pb_4$) which are the image signals of the second field are reproduced.

The image signals and the DPSK signal which are read by the magnetic head 12 are amplified by a reproduction amplifier 40. The luminance signal (Y+S), and the differential color signals (Pr+S) and (Pb+S) included in the read signals are passed through high-pass filters (not shown), respectively, and inputted into a reproduction process circuit 41 to be frequency-demodulated. The DPSK signal read from the magnetic disk D is also passed through a band-pass filter (not shown) and inputted into an ID reproduction process circuit 42 to be DPSK-demodulated so that the ID code is reproduced. This ID code is inputted in the system control circuit 10.

The output terminal of the reproduction amplifier 40 is also connected to an envelope detection circuit 43, by which the envelope of the reproduced signal read by the magnetic head 12 is sensed, and the envelope signal corresponding to the envelope is outputted to the system control circuit 10, which carries out an auto tracking operation of the magnetic head 12 through the tracking drive circuit 14 so that the envelope signal has a maximum value.

Due to the auto tracking operation of the magnetic head 12 and the rotational phase control of the spindle motor 13 described later, an excellent still image is obtained.

The luminance signal (Y+S), and the differential color signals (Pr+S) and (Pb+S) which are frequency-demodulated by the reproduction process circuit 41 are passed through a low-pass filter 44 with a cut-off frequency $f'_{cn}$, so that high frequency components of the signals are removed. Then, horizontal and vertical synchronizing signals (S) included in the signals are separated from the signals by a synchronizing-signal-separating circuit 46, and transmitted to the system control circuit 10 and a clock generating circuit 47. The horizontal and vertical synchronizing signals (S) inputted to the system control circuit 10 are used for other purposes such as reading the ID code. In the clock generating circuit 47, a memory writing clock signal (frequency $f'_{sn}$) based on which an image signal is written in each of memories 49A, 49B and 49C is generated, and the memory writing clock signal is inputted to an A/D converter 48 and a memory control circuit 45.

The luminance signal (Y), which has been frequency-demodulated, and from which the horizontal and vertical synchronizing signals (S) have been separated, is converted to a digital signal by the A/D converter 48, and stored in a predetermined address of the Y-memory 49A.

The differential color signal (Pr), which has been frequency-demodulated, and from which the horizontal and vertical synchronizing signals (S) have been separated, is converted to a digital signal by the A/D converter 48, and stored in the Pb-memory 49B. Similarly, the differential color signal (Pb) is converted to a digital signal by the A/D converter 48, and stored in the Pb-memory 49C.

The system control circuit 10 determines whether the image signal read by the magnetic head 12 are the luminance signals ($Y_1$ through $Y_8$), the differential color signals ($Pr_1$ through $Pr_4$) or the differential color signals ($Pb_1$ through $Pb_4$), in accordance with the reproduced ID code, and controls the memory control circuit 45 based on the result of the determination.

As described below, based on a memory writing clock signal outputted from the clock generating circuit 47, the following control is carried out by the memory control circuit 45 while the timing of writing data into the memories 49A, 49B and 49C is controlled by the memory control circuit 45.

Namely, based on the memory writing clock signal outputted from the clock generating circuit 47, the A/D converter 48 is operated at a frequency $f'_{sn}$, and the memory control circuit 45 controls a writing address counter included therein. Thus, the digital luminance signal (Y) is written into predetermined addresses in the Y-memory 49A with a frequency $f'_{sn}$.

The memory control circuit 45 controls the writing address counter included therein based on the memory writing clock signal outputted by the clock generating circuit 47. Thus, the digital differential color signals (Pr) and (Pb) are written into predetermined addresses in the Pr-memory 49B and the Pr-memory 49C with a frequency $f'_{sn}$.

Note, the synchronizing signal (S) included in reproduced signals, such as the luminance signal, is not sampled, and therefore, is not written in the memories 49A, 49B and 49C.

Horizontal and vertical synchronizing signals ($S_H$) according to the high definition image signal are outputted from a synchronizing signal generating circuit 50, and are inputted into a clock generating circuit 51. In this clock generating circuit 51, a memory reading clock signal (frequency $f'_{sh}$), based on which data is read out from each of the memories 49A, 49B and 49C, is generated. This memory reading clock signal is inputted to the memory control circuit 45, and a D/A converter 52A. The memory reading clock signal is frequency-divided by 2 by a divider 53, and the result is then inputted into D/A converters 52B and 52C.

As described below, based on the memory reading clock signal outputted from the clock generating circuit 51, the following control is carried out by the memory control circuit 45 while the timing of data reading from the memories 49A, 49B and 49C is controlled by the memory control circuit 45.

Namely, based on the memory reading clock signal outputted from the clock generating circuit 51, the memory control circuit 45 controls a reading address counter included therein, and thus, the digital luminance signal (Y) is read out from a predetermined address in the Y-memory 49A at the frequency $f'_{sh}$, and the D/A converter 52A is operated so that the luminance signal (Y) is converted to an analogue signal at the frequency $f'_{sh}$.

Based on the memory reading clock signal outputted from the clock generating circuit 51, the memory control circuit 45 controls a reading address counter included therein, and thus, the digital differential color signals (Pr) and (Pb) are read out from predetermined addresses in the Pr-memory 49B and the Pb-memory 49C at the frequency $f'_{sh}/2$, and the D/A converters 52B and 52C are operated so that the differential color signals (Pr) and (Pb) are converted to analogue signals at the frequency $f'_{sh}/2$.

Note, in the memory control circuit 45, the switching between writing to the memories and reading from the memories is controlled in accordance with a mode switching command signal outputted from the system control circuit 10.

Further note, the horizontal and vertical synchronizing signals (S) outputted from the synchronizing signal separating circuit 46 and the horizontal and vertical synchronizing signals (S) outputted from the synchronizing signal generating circuit 50 are inputted to the system control circuit 10, so that the signals are used for a rotational phase control of the spindle motor 13 and other operations.

When a high quality image is reproduced from the magnetic disk D in this embodiment, the memory reading clock signal outputted from the clock generating circuit 51 has a higher frequency, four times higher, for example, in comparison with the memory writing clock signal outputted from the clock generating circuit 47. Therefore, the frequency of the reading clock signal for the luminance signal is four times the frequency of the writing clock signal, and the frequencies of the reading clock signals for the differential color signals are twice the frequencies of the writing clock signals. Accordingly, the image signals are time-compressed in comparison with the image signals read out by the magnetic head 12. Thus, the image signals are reproduced in the same condition as when the image signals were inputted to the recording system. Due to this time-expansion, the normal image signal of the still video device read out from the magnetic disk D is transformed into a high definition image signal in the inputting operation to the recording system, and is reproduced.

The analogue luminance signal (Y) is passed through a low-pass filter 54A with a cut-off frequency $f'_{ch}$. Thus any high frequency components in the signal are removed. The analogue differential color signals (Pr) and (Pb) are passed through low-pass filters 54B and 54C with cut-off frequencies of $f'_{cn}/2$, respectively, and thus, high frequency components in these signals are removed. Then, these signals are added to the vertical and horizontal synchronizing signals ($S_H$), outputted from the synchronizing signal generating circuit 50, by the synchronizing signal mixing circuits 55A, 55B and 55C.

The luminance signal (Y+$S_H$), the differential color signals (Pr+$S_H$) and (Pb+$S_H$) obtained as described above are outputted as video signals through an output circuit (not shown), and thus, a still image can be reproduced by a display device connected to the still video device.

A proper condition, in which a normal image signal recorded on the magnetic disk D is time-compressed and the high definition image signal inputted to the recording system of the still video device is reproduced, is described below, with reference to the luminance signal (Y) as an example.

Suppose that the high definition image of one frame is divided into "m" parts by lines extending in vertical directions. In this case, when the image signal of each divided frame part is reproduced from the magnetic disk D, the sampling frequency with which all of the data included in "m" times the horizontal effective period of the normal image signal is reproduced in the horizontal effective period of the high definition image signal, should satisfy the following relationship (14).

$$(f'_{sh}/f'_{hh}) \cdot e'_{hh} \geq (f'_{sn}/f'_{hn}) \cdot e'_{hn} \cdot m \qquad (14)$$

Note, in the relationship (14), the number "m" is a natural number, $f'_{sh}$ is the sampling frequency for the high definition image signal (the frequency of the memory reading clock signal), $f'_{hh}$ is the horizontal scanning frequency of the high definition image signal, $e'_{hh}$ is the horizontal effective period ratio of the high definition image signal, $f'_{sn}$ is the sampling frequency of the normal image signal (the frequency of the memory writing clock signal), $f'_{hn}$ is the horizontal scanning frequency of the normal image signal, and $e'_{hn}$ is the horizontal effective period ratio of the normal image signal.

By transforming the relationship (14), the following relationship (15) is obtained, wherein K' is represented by the relationship (16):

$$f'_{sn} \leq f'_{sh} \cdot (f'_{hn}/f'_{hh}) \cdot (e'_{hh}/e'_{hn}) \cdot (1/m) = f'_{sh} \cdot K' \qquad (15)$$

$$K' = (f'_{hn}/f'_{hh}) \cdot (e'_{hh}/e'_{hn}) \cdot (1/m) \qquad (16)$$

The band of frequencies of the high definition image signal is increased by a factor ($f'_{sh}/f'_{sn}$) due to time-compression. Therefore, the normal image signal, in which the upper limit of the band of frequencies is limited by the low-pass filter 44 with a cut-off frequency $f'_{cn}$, is transformed to an image signal of the band $f'_{cn} \cdot (f'_{sh}/f'_{sn})$ due to time-compression. Accordingly, the cut-off frequency $f'_{ch}$ of the low-pass filter 54A connected to the D/A converter 52A is set to a value defined by the following relationship (17), taking account of the sampling theorem:

$$f'_{cn} \cdot (f'_{sh}/f'_{sn}) \leq f'_{ch} \leq f'_{sh}/2 \qquad (17)$$

On the other hand, the following relationship (18) is obtained from the relationship (15):

$$f'_{cn}/K' \leq f'_{cn}(f'_{sh}/f'_{sn}) \qquad (18)$$

Accordingly, the following relationship (19) is obtained from the relationships (17) and (18):

$$f'_{cn}/K' \leq f'_{cn}(f'_{sh}/f'_{sn}) \leq f'_{ch} \leq f'_{sh}/2 \qquad (19)$$

If the cut-off frequency $f'_{ch}$ is smaller than $f'_{cn} \cdot (f'_{sh}/f'_{sn})$, a high frequency component of the image signal is cut or removed, and therefore, the resolution of the image is lowered. On the other hand, if the cut-off frequency $f'_{ch}$ is larger than $f'_{sh}/2$, aliasing noise due to a sampling is included in the signed.

The following relationship (20) is obtained from the relationship (19):

$$f'_{sn}/K' \leq f'_{sh} \leq f'_{ch}(f'_{sn}/f'_{cn}) \leq (f'_{sn}/f'_{cn}) \cdot f'_{sh}/2 \qquad (20)$$

If the sampling frequency $f'_{sh}$ is smaller than $f'_{sn}/K'$, some pixels are not reproduced from the magnetic disk D.

The upper limit frequency $f'_{cs}$ of the band of frequencies of the image signal which can be reproduced from the magnetic disk D satisfies the following relationship (21):

$$f'_{cn} \leq f'_{cs} \qquad (21)$$

If the upper limit frequency $f'_{cs}$ is smaller than $f'_{cn}$, the image signal in which the maximum frequency is higher than $f'_{cs}$ cannot be completely reproduced from the magnetic disk D. Namely, high frequency components of the image signal cannot be reproduced from the magnetic disk D, and thus the resolution of the image is lowered.

Note, regarding the differential color signals (Pr) and (Pb), the cut-off frequency of each of the low-pass filters 54B and 54C is $f'_{ch}/2$, the sampling frequency of each of the D/A converters 52B and 52C is $f'_{sh}/2$, and the number of divisions by a vertical line is m/2 (wherein m≠1). Therefore, the proper condition is the same as the above relationships (20) and (21).

As described above, in the embodiment, when the normal image signal read out from the magnetic disk D is time-compressed so that the high definition image signal inputted to the recording system is reproduced, the above conditions are selected.

Namely, in the reproducing system of the still video device, each of the low-pass filters 54A, 54B and 54C is constructed in such a manner that the cut-off frequency $f'_{ch}$ satisfies the relationship (19), the reproducing mechanism is constructed in such a manner that the upper limit frequency $f'_{cs}$ of the band of frequencies of the image signal which can be reproduced from the magnetic disk D satisfies the relationship (21), and the clock generating circuit 47 is constructed in such a manner that a clock signal, by which the sampling frequency $f'_{sh}$ of each of the D/A converters 52A, 52B and 52C satisfies the relationship (19), is generated.

Therefore, since the time-compression is properly carried out when the image signal is reproduced from the magnetic disk D, the still video device does not have a drawback in which, for example, a part of the image (a pixel located at an end portion of the frame, for example) is lost and the resolution of the image is lowered, and thus an excellent high definition image is reproduced.

Such the effect can be obtained when a magnetic disk, on which an image signal is recorded by a recording system which is not included in the present invention, is reproduced by the reproduced of the embodiment. To obtain an excellent high definition image, however, it is preferable to reproduce a magnetic disk recorded by the recording system included in the present invention.

Note, in the above embodiment, the ratio of the number of tracks on which the luminance signal (Y) is recorded to the number of tracks on which the differential color signal (Pr) to the number of tracks on which the differential color signal (Pb) is 4:2:2 regarding the image signal corresponding to one image, but the ratio may be 4:1:1, or 2:2:2, for example.

Further, although the magnetic head 12 for recording and reproducing the image signal is single in the above embodiment, a plurality of magnetic heads can be provided in the recording system and the reproducing system, respectively. In such a case, each of the magnetic heads can be a magnetic head exclusively provided for each of the luminance signal (Y), the differential color signal (Pr) and the differential color signal (Pb), and the number of magnetic heads may correspond to the number of image signals of one field, namely, eight magnetic heads may be provided in the above embodiment (see FIG. 3).

Further, although the image signal is recorded in the frame record mode in the above embodiment, the present invention can be applied to a device which can use the field record mode.

Further, although the differential color signal (Pr) and the differential color signal (Pb) are recorded on different tracks in the above embodiment, these signals may be recorded on the same track or more than two tracks. In this case, the differential color signal (Pr) and the differential color signal (Pb) may be line-sequential-recorded, or may be divided into a plurality of parts in one horizontal synchronizing period (for example, divided into a former half and a latter half) and recorded on separate tracks. Note, when the differential color signals are line-sequential-recorded, the luminance signal and the differential color signals are recorded on the same track or more than two tracks.

Although, in one frame, the luminance signal (Y), the differential color signal (Pr) and the differential color signal (Pb) are divided, respectively, in the above embodiment, only one or two of the luminance signal (Y), the differential color signal (Pr) and the differential color signal (Pb) included in one frame may be divided. Further, the luminance signal (Y), the differential color signal (Pr) and the differential color signal (Pb) may be not divided.

Although the above embodiment is constructed in such a manner that the proper conditions of the time-expansion and the time-compression are satisfied for the luminance signal (Y), the differential color signal (Pr) and the differential color signal (Pb), the device may be constructed in such a manner that the proper conditions of the time-expansion and the time-compression are satisfied for at least one of the luminance signal (Y), the differential color signal (Pr) and the differential color signal (Pb).

Although, in the above embodiment, the recording operation and the reproducing operation are carried out from an outer track to an inner track of the magnetic disk D for image signals corresponding to one frame, the present invention is not restricted to this operating direction. Further, the present invention is not restricted to the recording pattern shown in FIG. 3.

In the present invention, the recording medium of the image signal is not restricted to a magnetic recording medium such as a magnetic disk, but may be an optical recording medium or a magneto-optical recording medium.

The still video device of the present invention may have only a recording system or a reproducing system, or may have both a recording system and the reproducing system.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 4-350910 (filed on Dec. 3, 1992) which is expressly incorporated herein, by reference, in its entirety.

What is claimed is:

1. A still video device for recording an image signal in a recording medium, an upper limit of a band of frequencies of said image signal which can be recorded in said recording medium being $f_{cs}$, said device comprising:
   a memory in which a high definition image signal corresponding to one frame can be stored, a horizontal scanning frequency of said high definition image signal being $f_{hh}$, a horizontal effective period ratio of said high definition image signal being $e_{hh}$, said upper limit of said band of frequencies of said high definition image signal being $f_{ch}$;
   means for storing said high definition image signal in said memory at a sampling frequency $f_{sh}$;
   means for dividing said high definition image signal stored in said memory into "m" parts, "m" being a natural number;
   means for reading from said memory said divided high definition image signal, at a sampling frequency $f_{sn}$, to time-expand said divided high definition image signal, and to set said upper limit of said band of frequencies of said time-expanded image signal to $f_{cn}$ to obtain a normal image signal which can be recorded on said recording medium; and
   means for recording said recording image signal on said recording medium; wherein
   the above parameters satisfies the following relationships:

$$f_{ch} \cdot K \leq f_{ch} \cdot (f_{sn}/f_{sh}) \leq f_{cn} \leq f_{sn}/2, \text{ and } f_{cs} \geq f_{cn}$$

wherein $$K = (f_{hn}/f_{hh}) \cdot (e_{hh}/e_{hn}) \cdot (1/m), f_{hn}$$

being a horizontal scanning frequency of said normal image signal, and $e_{hn}$ being a horizontal effective period ratio of said normal image signal.

2. A device according to claim 1, wherein said reading means comprises a low-pass filter having a cut-off frequency $f_{cn}$ by which said band of frequencies of said time-expanded image signal is limited.

3. A device according to claim 1, wherein said parameters satisfy the following relationships:

$$f_{sh} \cdot K \leq f_{sn} \leq f_{cn} \cdot (f_{sh}/f_{ch}) \leq (f_{sh}/f_{ch}) \cdot f_{sn}/2.$$

4. A device according to claim 2, wherein said upper limit frequency $f_{cs}$ is 8.5 MHz, said sampling frequency $f_{sn}$ is 18 MHz, and said cut-off frequency $f_{cn}$ is between 7.27 MHz and 8.5 MHz.

5. A device according to claim 1, wherein a number of pixels in one horizontal scanning line of said high definition image signal is equal to "m" multipled by the number of pixels in one horizontal scanning line of said normal image signal.

6. A still video device for reproducing an image signal from a recording medium, an upper limit of a band of frequencies of said image signal which can be reproduced from said recording medium being $f'_{cs}$, a high definition image signal corresponding to one frame being divided into "m" parts, m being a natural number, and time-expanded to become a normal image signal which is stored in said recording medium, said device comprising:

means for storing said divided normal image signal recorded in said recording medium in a memory at a sampling frequency $f'_{sn}$, an upper limit of a band of frequencies of said divided normal image signal being $f'_{cn}$;

means for reading from the memory said divided normal image signal at a sampling frequency $f'_{sh}$ to time-compress said divided normal image signal, said reading means combining said divided normal image signals to form one time-compressed image signal; and means for generating a high definition image signal from said time-compressed image signal, said generating means setting said upper limit of said band of frequencies of said time-compressed image signal to $f'_{ch}$ to obtain said high definition image signal, a horizontal scanning frequency of said high definition image signal being $f'_{hh}$, a horizontal effective period ratio of said high definition image signal being $e'_{hh}$;

the above parameters satisfying the following relationships:

$$f'_{cn}/K' \leq f'_{cn} \cdot (f'_{sh}/f'_{sn}) \leq f'_{ch} \leq f'_{sh}/2, \text{ and } f'_{cs} \geq f'_{cn}$$

wherein $$K' = (f'_{hn}/f'_{hh}) \cdot (e'_{hh}/e'_{hn}) \cdot (1/m), f'_{hn}$$

is a horizontal scanning frequency of said normal image signal, and $e'_{hn}$ is a horizontal effective period ratio of said normal image signal.

7. A device according to claim 6, wherein said generating means comprises a low-pass filter having a cut-off frequency $f'_{ch}$, by which said band of frequencies of said time-compressed image signal is limited.

8. A device according to claim 6, wherein the parameters satisfy the following relationship:

$$f'_{sn}/K' \leq f'_{sh} \leq f'_{ch}(f'_{sn}/f'_{cn}) \leq (f'_{sn}/f'_{cn})f'_{sh}/2.$$

9. A still video device for recording an image signal in a recording medium, an upper limit of a band of frequencies of said image signal which can be recorded in said recording medium being $f_{cs}$, said device comprising:

a memory in which a high definition image signal corresponding to one frame can be stored, a main scanning frequency of said high definition image signal being $f_{hh}$, a main effective period ratio of said high definition image signal being $e_{hh}$, an upper limit of a band of frequencies of said high definition image signal being $f_{ch}$;

means for storing said high definition image signal in said memory at a sampling frequency $f_{sh}$;

means for dividing said high definition image signal stored in said memory into "m" parts in every main scanning line direction, "m" being a natural number;

means for reading from said memory said divided high definition image signal, at a sampling frequency $f_{sn}$, to time-expand said divided high definition image signal, and to set an upper limit of a band of frequencies of the time-expanded image signal to $f_{cn}$ to obtain a normal image signal which can be recorded on said recording medium; and means for recording said recording image signal on said recording medium;

the above parameters satisfying the following relationships:

$$f_{ch} \cdot K \leq f_{ch} \cdot (f_{sn}/f_{sh}) \leq f_{cn} \leq f_{sn}/2, \text{ and } f_{cs} \geq f_{cn}$$

wherein $$K = (f_{hn}/f_{hh}) \cdot (e_{hh}/e_{hn}) \cdot (1/m), f_{hn}$$

being a main scanning frequency of said normal image signal, and $e_{hn}$ being a main effective period ratio of said normal image signal.

10. A device according to claim 9, wherein said main scanning line direction comprise a horizontal scanning line direction.

11. A device according to claim 9, wherein a number of pixels in one horizontal scanning line of said high definition image signal is equal to "m" multipled by a number of pixels in one horizontal scanning line of said normal image signal.

* * * * *

UNITED STATES PATENT AND TRADEMARK OFFICE
CERTIFICATE OF CORRECTION

PATENT NO. : 5,434,675
DATED : July 18, 1995
INVENTOR(S) : K. SATO et al.

It is certified that error appears in the above-indentified patent and that said Letters Patent is hereby corrected as shown below:

On the cover, in section [57], "ABSTRACT", line 16, delete "fce≥fcn".
    On the cover, in section [57], "ABSTRACT", between lines 16 and 17, insert ---fce≥fcn---.
    At column 20, line 48 (claim 10, line 2), change "comprise" to ---comprises---.

Signed and Sealed this

Fourteenth Day of May, 1996

Attest:

BRUCE LEHMAN

*Attesting Officer*     *Commissioner of Patents and Trademarks*